Figure 1:
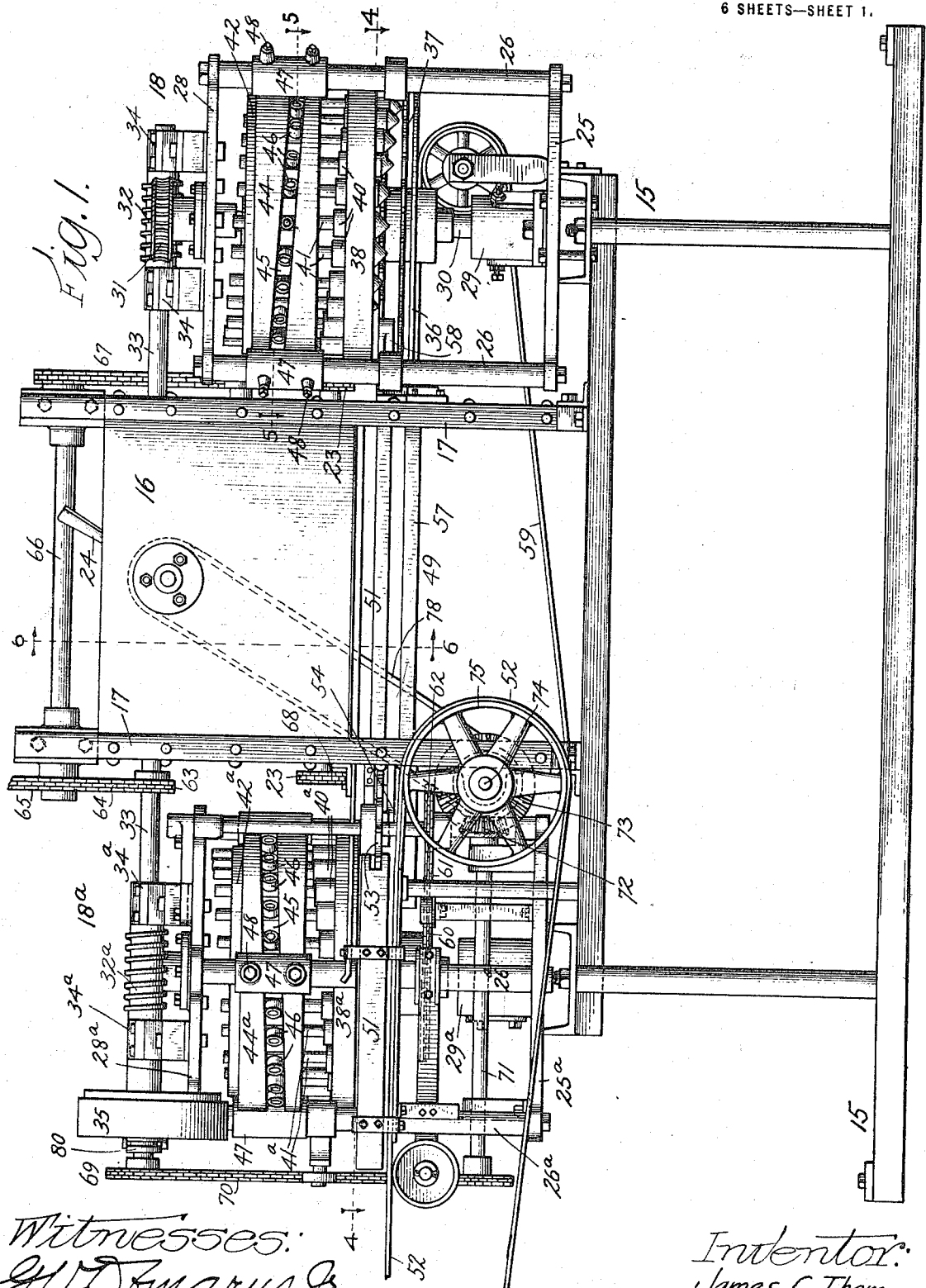

J. C. THOM.
PACKING PULVERULENT MATERIAL IN TRAVELING CONTAINERS.
APPLICATION FILED APR. 26, 1913.

1,177,066.

Patented Mar. 28, 1916.
6 SHEETS—SHEET 1.

Witnesses:
G. W. Domarus Jr.
R. Bauerle

Inventor:
James C. Thom
BY Meyers, Cushman & Rea
Attys

J. C. THOM.
PACKING PULVERULENT MATERIAL IN TRAVELING CONTAINERS.
APPLICATION FILED APR. 26, 1913.

1,177,066.

Patented Mar. 28, 1916.
6 SHEETS—SHEET 2.

Witnesses:
W. Domarus Jr.
R. Bauerle

Inventor:
James C. Thom
By: Meyers, Cushman & Rea
Attys.

J. C. THOM.
PACKING PULVERULENT MATERIAL IN TRAVELING CONTAINERS.
APPLICATION FILED APR. 26, 1913.

1,177,066.

Patented Mar. 28, 1916.
6 SHEETS—SHEET 5.

Witnesses:
Inventor:
James C. Thom
By Meyers, Cushman & Rea
Attys

J. C. THOM.
PACKING PULVERULENT MATERIAL IN TRAVELING CONTAINERS.
APPLICATION FILED APR. 26, 1913.
1,177,066.
Patented Mar. 28, 1916.
6 SHEETS—SHEET 6.
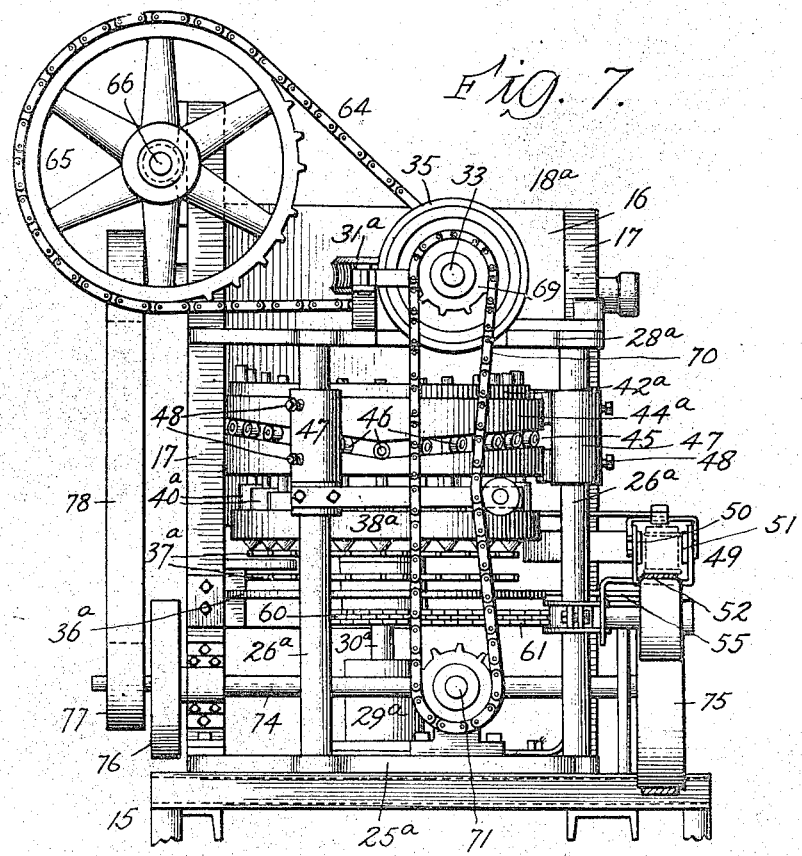
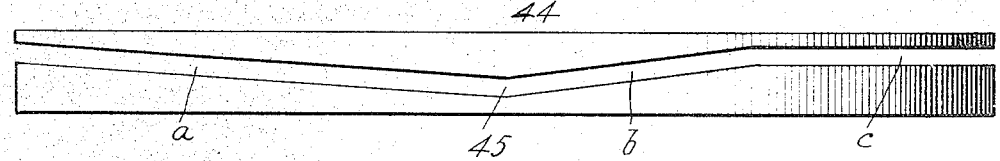
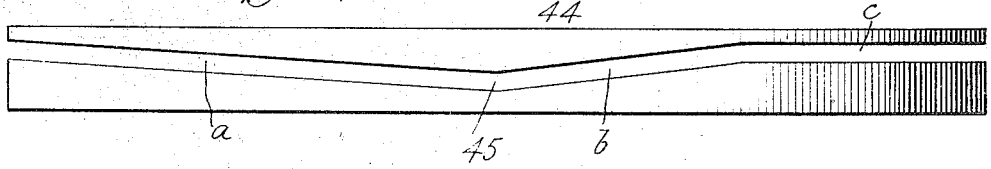
Witnesses:
Inventor
James C. Thom
By Myers, Cushman &c.
Attys.

UNITED STATES PATENT OFFICE.

JAMES C. THOM, OF CHICAGO, ILLINOIS, ASSIGNOR TO WEYMAN-BRUTON COMPANY, OF NEW YORK, N. Y., A CORPORATION OF NEW JERSEY.

PACKING PULVERULENT MATERIAL IN TRAVELING CONTAINERS.

1,177,066.  Specification of Letters Patent.  Patented Mar. 28, 1916.

Application filed April 26, 1913. Serial No. 763,758.

*To all whom it may concern:*

Be it known that I, JAMES C. THOM, a citizen of the United States, residing at Chicago, in the county of Cook and State of Illinois, have invented new and useful Improvements in Packing Pulverulent Material in Traveling Containers, of which the following is a specification.

This invention relates to packing machines, particularly to machines of this type for packing pulverulent or granular material in containers.

The prime object of the present invention is to provide a machine that shall be reliable and expeditious in its operation to compete successfully with hand labor, and thoroughly accurate in measuring the quantity of material packed in the containers, particularly when used for the purpose designed, that is, filling and packing snuff in cylindrical tin cans or boxes, as under the internal revenue laws of the United States, all packages containing tobacco products must be sealed with a stamp on which is indicated the quantity and kind of product therein contained.

Another object of the invention is to provide a machine that will fill and pack as compactly as desired, successive charges of material in containers until the proper quantity has been placed therein, the entire operation being performed by the machine without manual assistance, from the time the empty containers are placed on the feeding belt until they are discharged ready for the closures.

A further object of the invention resides in the packing devices proper, wherein a large number of compression plungers are grouped within small compass, each plunger acting individually upon the contents of a container with gradually increasing pressure to pack said contents therein and then be withdrawn to permit the containers continuing their course through the machine to be again filled and again packed by other groups of plungers as many times as necessary until the required quantity of material has been placed in the containers. The plungers of each group are operated by a suitably disposed cam surface which causes them to move gradually into the containers to pack the material therein and then gradually withdraw therefrom, said cam surface being adjustably mounted to increase or decrease the pressure exerted by the plungers as circumstances may demand.

A still further object of the invention is to provide a hopper or receptacle for the material to be packed having a number of outlets for the material in the bottom thereof; and to provide a circuitous runway for the containers extending back and forth below the hopper outlets to guide said containers into position to be filled each time before passing to the pressing plungers, said runway including movable sections by means of which the containers are caused to travel along said runway.

With these and other objects in view, the invention consists of the novel construction, combination and arrangement of parts hereinafter described in detail and pointed out in the appended claims, reference being had to the accompanying drawings, in which—

Figure 2:
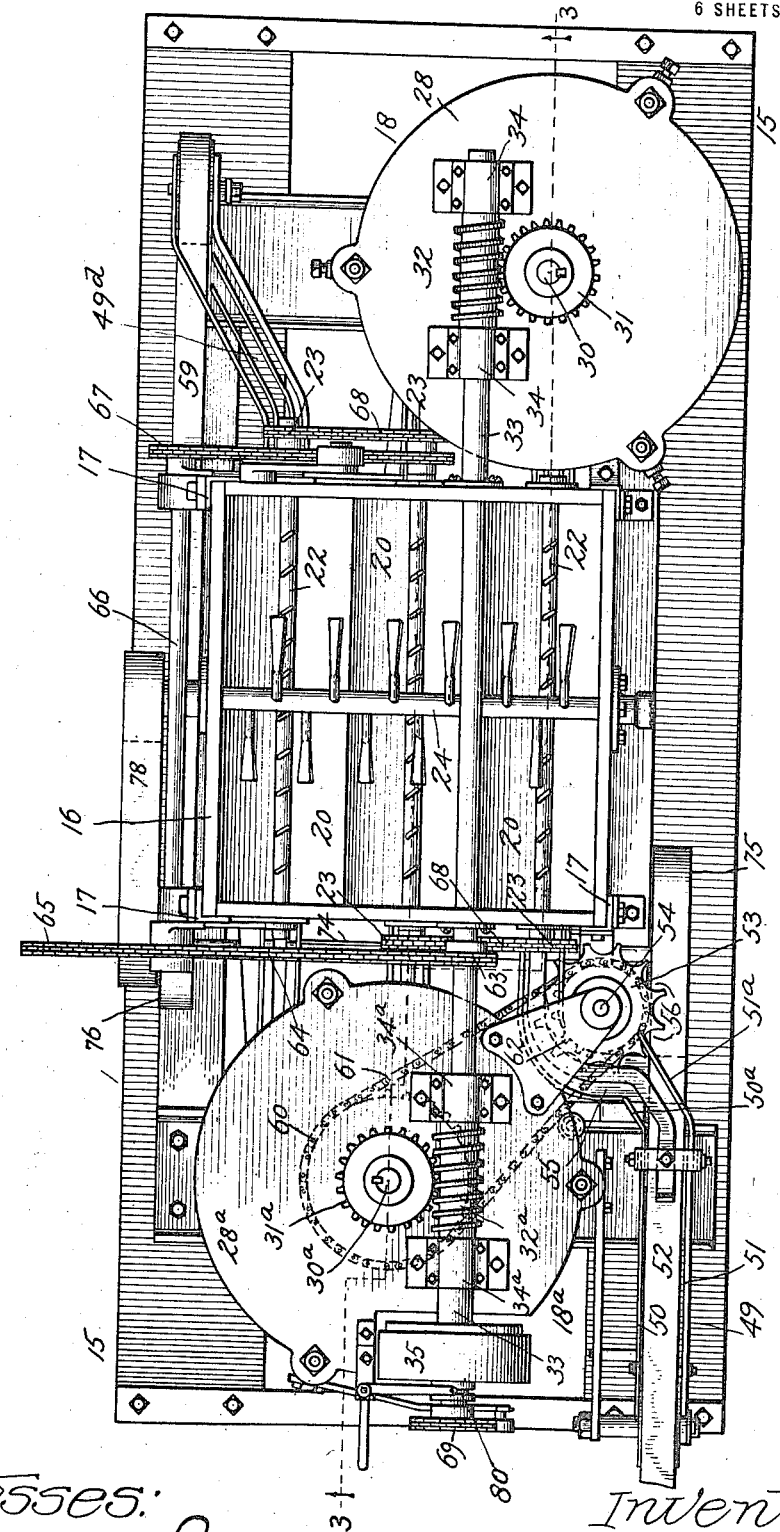
Figure 3:
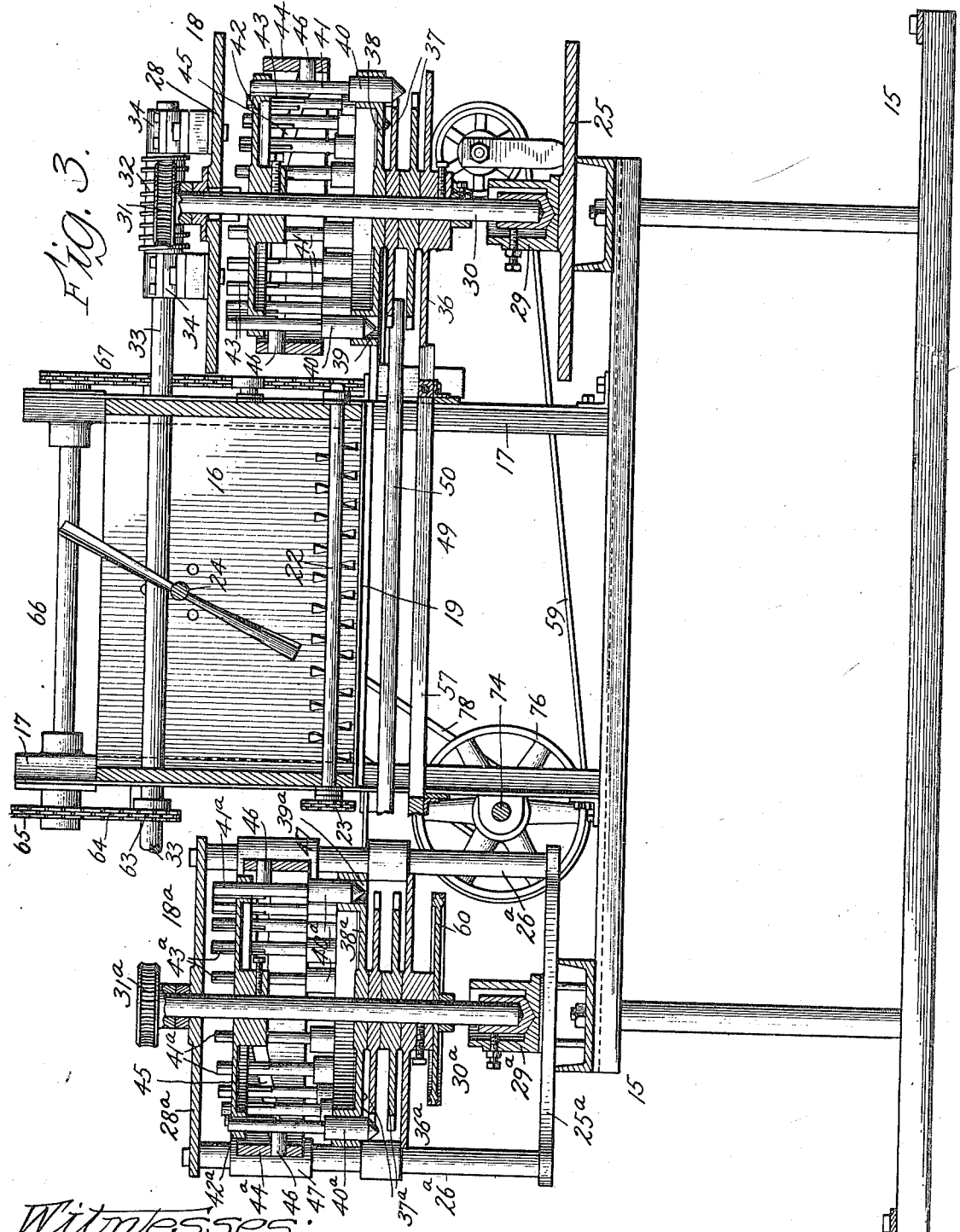
Figure 4:
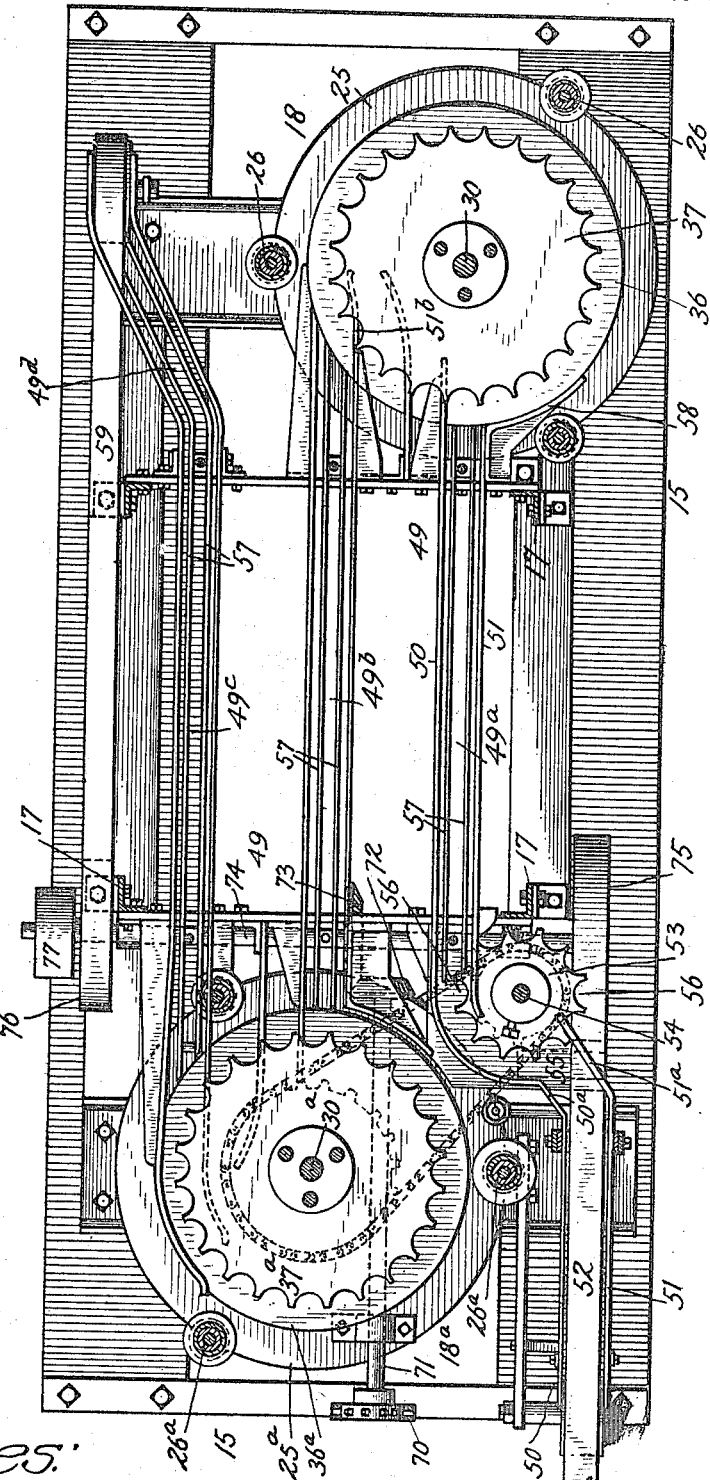
Figure 5:
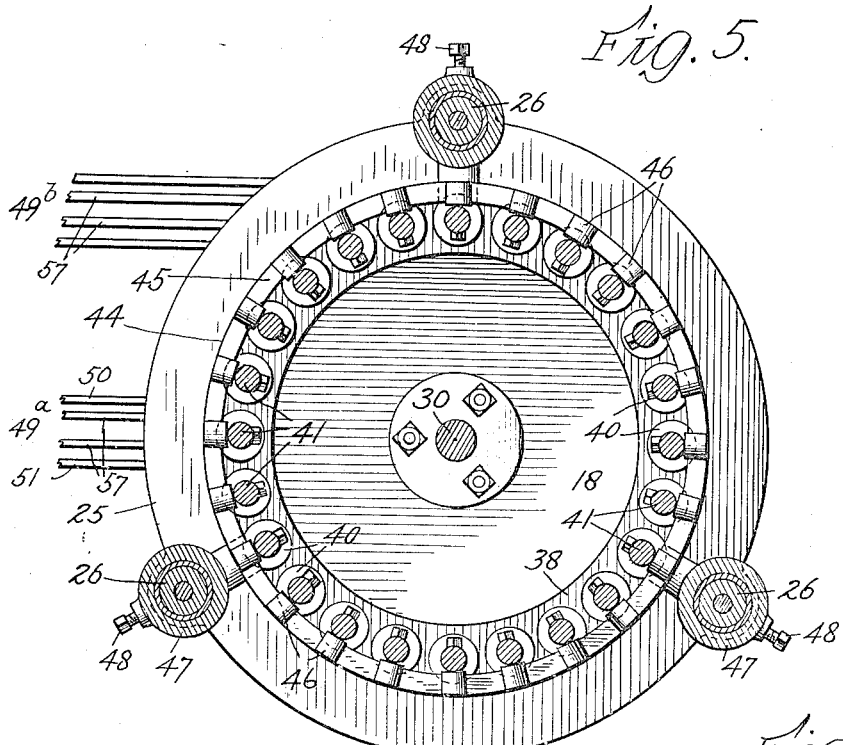
Figure 6:
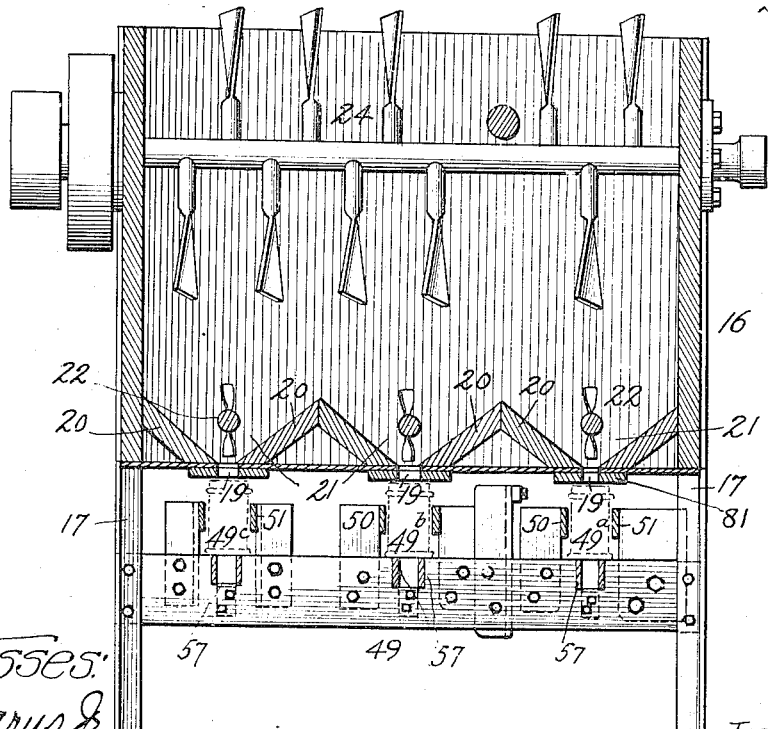

Figure 1 is a side elevation of the machine with the feeding or entering end at the left hand side. Fig. 2 is a plan view of the machine. Fig. 3 is a sectional view on the line 3—3 of Fig. 2. Fig. 4 is a sectional view on the line 4—4 of Fig. 1, showing the general arrangement of the run-way including the movable sections or rotary carrying disks for the containers. Fig. 5 is a sectional view on the line 5—5 of Fig. 1, showing the stationary cam ring and the vertically moving filling plungers. Fig. 6 is a sectional view on the line 6—6 of Fig. 1, showing the hopper and agitator mechanism. Fig. 7 is an end elevation of the machine looking in the direction of the feeding or entering end. Fig. 8 is a developed view of the cam ring employed for actuating the initial compressing plungers. Fig. 9 is a developed view of the cam ring employed for actuating the finishing compressing plungers.

In the drawings 15 indicates a rigid supporting frame resting upon the floor and projecting upwardly a sufficient distance to bring the mechanism mounted thereon at a convenient height for operation. I provide means for holding the substance to be packed, preferably arranged as follows: Above the frame 15 and extending transversely thereof at about its middle is a hopper or receptacle 16 secured at its corners to legs 17 bolted to the frame. At the sides of the hopper 16 are pressing devices shown at 18, 18ᵃ, by means of which the material or substance to be packed passing from the hopper into the containers is successively compressed. In the present instance but two pressing devices are shown, but this number may be increased to any extent demanded by the character of the matter to be packed and the amount to be packed in the containers. Through the bottom of the hopper 16 are a number of straight slots 19, by means of which the material contained in the hopper escapes into the containers below. The bottom of the hopper on each side of said slots 19 is inclined as shown at 20, Fig. 6, to direct the material into the slots, and as there shown forming on the bottom furrows 21, in each of which furrows is a rotating stirrer or agitator 22 extending longitudinally thereof, the ends of which project through the walls of the hopper or receptacle, and are provided with sprocket wheels 23, by which the stirrers are rotated in a manner to be described hereinafter. Above the stirrers or agitators 22 is an agitator 24 extending at right angles to the furrows and provided with longer arms than the agitators 22, for the purpose of keeping the material in the upper part of the hopper in a light condition, and to prevent the same from packing.

On opposite ends of the top of the main frame 15 are secured circular plates 25, 25ª, from which rise vertical standards 26, 26ª, respectively, to the top of which standards are fastened other circular plates 28, 28ª, the whole forming two rigid supporting frames for the packing devices. The plates 25, 25ª have affixed thereto in their centers step bearings 29, 29ª, in which are journaled the lower ends of vertical shafts 30, 30ª, supported at their upper ends in bearings on the plates 28, 28ª, and provided at their extremities with worm gears 31, 31ª, affixed thereto, which gears are driven by worms 32, 32ª secured on a horizontal shaft 33, turning in bearings 34, 34ª, bolted to the top plates 28, 28ª. A belt wheel 35 on the shaft 33 imparts motion to said shaft when coupled up to any suitable source of power. Secured to each shaft 30, 30ª above the step bearings, are horizontal disks 36, 36ª, which serve as supports for the containers while the material is being packed therein. A short distance above said disks and also secured to each shaft are two other disks 37, 37ª, said disks having peripheral teeth or fingers, as shown in Fig. 4, and semi-circular recesses between the fingers in which the containers are seated, and by which they are rotated and caused to advance through the machine. Immediately above the upper of the toothed disks 37, 37ª, are flanged disks 38, 38ª, the flanges of which are formed with a plurality of vertical holes 39, 39ª, therein, through which slide vertically disposed packing plungers 40, 40ª having in the present instance conical lower ends and reduced stems 41, 41ª on their upper ends, said stems sliding through openings in disks 42, 42ª, above the flange disks and secured on the shafts 30, 30ª. The stem 41 of each packing plunger is preferably provided with a feather 43 slidable in a notch in disks 42, 42ª, to prevent the plunger from turning.

The plungers 40, 40ª are arranged in two circular series, each group of plungers operating independently of the other group, and each plunger movable irrespective of the other plungers in its own series. These plungers are given movement in a vertical direction by cam rings 44, 44ª, surrounding the respective groups of plunger stems in each of which rings is a cam groove 45 that acts on pins 46 projecting from the plunger stems, and causes them to impart a rising and falling movement to the plungers. The cam grooves 45 are shown developed in Figs. 8 and 9, and as there represented the groove inclines downwardly at $a$ for a certain distance and then rises again at $b$, the rise being quicker than the descent. At the top of the rise there is a horizontal portion $c$ which connects the rising portion $b$ with the descending portion $a$. As thus arranged the shafts 30, 30ª, as they rotate carry the plungers with them, and the pins 46 projecting from the stems of the plungers travel in the cam grooves, descending when they pass along the portion $a$ of said grooves to compress the material, then rise more quickly in passing along the portion $b$ to withdraw the flanges from the containers and then when fully withdrawn to be held in elevated position while the pins pass through the horizontal portions $c$.

To increase or decrease the amount of pressure exerted by the plungers the cam rings 44, 44ª, may be altered; for this purpose they are adapted to be raised and lowered relatively to the supporting disks 36, 36ª, on which the containers are carried. To provide for this adjustment each cam ring is provided on its periphery with sleeves 47 adapted to slide on the standards 26, 26ª, and be secured thereto by bolts 48, passing through the sleeves and bearing against the surfaces of the standards. By loosening these sleeves and raising and lowering them on the standards 26, 26ª, the plungers will be raised and lowered in the flanged disks 38, 38ª, and their distance from the containers supported upon disks 36, 36ª, adjusted to suit the amount of material to be packed thereinto, and the degree of pressure to which it is to be subjected.

The containers are guided in their movement through the machine beneath the hopper or receptacle 16 and the several packing mechanisms by a circuitous run-way 49 which passes back and forth through the machine and guides the traveling containers beneath the hopper and the packing devices alternately. The supporting disks 36, 36ª and the fingered disks 37, 37ª, form part of this run-way, and by the rotary movement of these disks the containers are assisted in their travel along the run-way. In the present instance the run-way may be divided into three sections, viz. an entrance section 49ª extending beneath the hopper 16 to the pressing device 18, an intermediate section 49ᵇ, between the two pressing devices and below the hopper; and a delivery section 49ᶜ also below the hopper and extending from the pressing device 18ª. Between each two sections which are fixed is a movable portion comprising the rotary disks 36, 36ª, 37, 37ª. The fixed sections are formed of two parallel side rails 50, 51 spaced apart a distance to permit the containers to pass freely therethrough and having a bottom or floor formed of two rails 57 on the edges of which the containers move easily. Near the entrance to the section 49ª the bottom is a traveling belt 52 upon which the containers are placed one after another, and by which they are moved through the entering end of the run-way a short distance until near a feed wheel 53 mounted on a vertical shaft 54, said wheel resembling the toothed disks 37, 37ª, but of smaller diameter. The side rails 50, 51, just before reaching the toothed disk 53, are both deflected to one side or inwardly as at 50ª, 51ª, whereby the containers are guided off the belt 52 onto a table 55 below the feed wheel 53 and successively into the depressions 56 of said wheel, by which they are given a partial rotation about the axis of said feed wheel and directed through the continuation of the section 49ª of the run-way, which extends in a straight longitudinal direction beneath one of the outlet openings 19 in the hopper toward the center of the supporting disk 36 of the packing device 18. The bottom rails 57 terminate at the periphery of the supporting disk 36 their upper surfaces being in the same plane as the top of said disk, so that the containers as they are driven along the run-way pass without interruption from said rails onto said supporting table. The guide rail 50 projects over the supporting disk while the guide rail 51 terminates at its peripheral edge, and is provided with a projecting tongue 58 that extends in the direction of rotation of said disk to crowd the containers into the notches between the teeth of the disks 37. As soon as the containers are pushed upon the supporting disks 36 they are carried around thereby for about three fourths of a revolution, during which time they are held below the packing plungers 40 as the latter move downwardly thereinto to pack their contents. As soon as the plungers have withdrawn from the containers, which will be after they have made a three-fourths turn about the axis of the shaft 30, they pass onto the intermediate section 49ᵇ of the run-way, being directed thereon by a continuation 51ᵇ of the side rail 51, which projects over the supporting disk 36 in position to pass back of the containers as they travel around and force them from the notches in the toothed disks 37. The continuation 49ᵇ of the run-way extends parallel to the section 49ª, and terminates at the packing device 18ª beneath which containers travel in the same manner as they did under the packing device 18, from whence they are delivered to the final section 49ᶜ of the run-way. The portions 49ª and 49ᶜ of the run-way pass below an outlet 19 of the hopper so that the containers as they travel along the run-way receive material from the hopper. Extending from the packing mechanism 18ª, and straight beneath the hopper 16, the section 49ᶜ of the run-way is deflected laterally at 49ᵈ to cause the containers traveling therein to pass onto a horizontal delivery belt 59, by means of which they are removed or carried away from the machine.

Power being applied to the belt pulley 35 the horizontal shaft 33 and the worms 32, 32ª thereon are rotated. The worm wheels 31, 31ª in engagement with said worms are also rotated, thus turning the shafts 30, 30ª and the several disks mounted thereupon. The pressing devices 18, 18ª are disposed on opposite sides of the shaft 33, as shown in Fig. 1, whereby their shafts 30, 30ª are turned in opposite directions with the result that the series of compressing plungers 40 in the pressing device 18 are turned in a counter-clockwise direction, whereas the plungers 40ª in the pressing device 18ª rotate in a clockwise direction. This is necessary in order that the containers may be moved to and fro beneath the hopper or receptacle 16. On the lower end of the shaft 30ª below the run-way is a sprocket wheel 60, which drives through a sprocket chain 61, a smaller sprocket wheel 62 on the vertical shaft 54 carrying the finger feed wheel 53, by which the containers are pushed through the section 49ª of the run-way. A small sprocket wheel 63 on the shaft 33 drives through a chain 64 a large sprocket wheel 65 on a horizontal shaft 66 mounted in bearings secured on the upper ends of two of the legs 17 which support the hopper. This shaft 66 is connected by sprocket gearing 67 with one end of the central stirrer 22, said stirrer having sprocket wheels 23 on each end, from which sprocket chains 68 extend each to a sprocket wheel 23 on one end of the other stirrers 22. By this means all the stirrers are given a continuous and regular rotary movement. On the outer end of the shaft 33 adjacent the belt pulley 35 is fixed a sprocket wheel 69, which through a sprocket chain 70 drives a sprocket wheel on a short counter-shaft 71 mounted in bearings on the base plate 25ª of the pressing device 18ª, and lies below said pressing device. The opposite end of the shaft 71 has affixed thereon a beveled gear wheel 72 meshing with a like beveled gear 73 on a cross shaft 74, the forward end of which carries a pulley 75, about which the feed belt 52 passes. On the opposite ends of said shaft 74 at the rear of the machine is a second pulley 76, by means of which the delivery belt 59 is given motion. Beyond the belt wheel 76 is a smaller belt wheel 77 that drives a belt 78 by which the upper agitator 24 is given rotary movement.

Power being applied to the belt pulley 35, when it is desired to operate the machine, the clutch 80 is turned to engage the belt pulley and shaft 33, whereupon various parts of the machine begin to move. Empty containers are placed upon the feed belt 52 closely following one another in a train and are carried by said belt through the entrance end to the deflected portions 50ª, 51ª of the side rails of said runway, by which the containers are deflected from the belt onto the table 55 and into the depressions 56 of the feed wheel 53. Each container enters a depression in said feed wheel and is carried around the axis of said wheel for a quarter revolution, and is pushed by the succeeding containers along the straight section 49ª of the channel way under the first outlet opening 19 in the bottom of the hopper or receptacle 16. The hopper or receptacle has in the meantime been filled with the substance or material to be packed and the agitators in said hopper being rotated the material is kept in a light fluffy condition, so that it will, without difficulty, pass out through the long narrow openings 19 in the bottom to the containers. The containers as they pass under the hopper 16 along the section 49ª of the run-way slide upon the bottom rails 57 between the side rails 50, 51, the top or open end of the container running close to the under surface of a smooth plate 81 secured on the bottom of the hopper, and through which the escape opening 19 is formed. The length of the opening 19 is such that during the passage of each container thereunder it will be filled with the escaping material, the plate 81 preventing such material from rising above the top edge of the container so that when it passes beyond the receptacle each container will be substantially filled even with its top with the material in an uncompressed state.

After leaving the receptacle 16 and its opening 19 the various containers, which it is to be understood are moved toward the packing device 18 by the pressure of the containers following being fed along the runway by the feed wheel 53, are pushed onto the rotating supporting disk 36 between the fingers of the positioning disks 37, and seated in the depressions in said latter disks by means of the finger 58, which projects in the direction of rotation of said disks from the side rail 51. The containers with the first charge of material therein are carried around for about three fourths of a revolution by the movement of the supporting and positioning disks during which movement the packing plungers 40, which are immediately above the seated containers are forced downwardly by the portion $a$ of the cam groove 45 acting on the pins 46 projecting from said plungers. Before completing the three fourths revolution on the carrying disk 36 the plungers will have completed the downward movement and be again elevated sufficiently high to be withdrawn from the container, having during their movement packed the initial charge of material in the containers. After the withdrawal of the plungers the containers receive a second charge in contact with the first charge by passing upon the section 49ᵇ of the run-way by the projecting end 51ᵈ of the side rail, but which projects over the disk 36 in such position that the containers as they travel around with the disks will be lifted out of the depressions in the positioning disk and off the carrying wheel 36 onto the bottom rails 57 of the run-way. Passing thence under the center opening 19 in the bottom of the hopper or receptacle 16, the containers are again charged with material, said containers filling to their upper edge and passing onto the carrying disk 36ª of the second packing device 18ª. The second charge of material is here compressed as it travels around with the supporting disk 36ª in a manner similar to the compression performed in the packing device 18 at the completion of which packing the containers pass to the run-way section 49ᶜ and under the third and final opening 19 in the hopper 16 receiving the final charge which is in an uncompressed state and which fills the container and completes the amount necessary to fill the same with the required weight of material. After passing from beneath the hopper 16 the containers are moved laterally at an angle by passing along the deflected portion 49ᵈ of the run-way onto a delivery belt 59, by means of which they are carried onto a table or wherever desired in order that closures may be applied to the containers.

After filling the containers, should it be discovered that not enough material has been packed in the containers to give them the desired uniform weight the cam rings 44, 44ª may be lowered, thus increasing the pressure of the plungers and packing the material more closely within the containers, whereby more of said material may enter the same during subsequent passages under the receptacle. If the containers are found to be too heavy the cam rings may be raised thereby reducing the pressure of the plungers and lessening the degree to which the material is packed and necessarily permitting less material to enter during subsequent charges. In this way the weight of the packages can be nicely regulated.

While in the present illustration but two packing devices are shown, it is evident this number may be increased to any extent whatever, without changing the invention in the least, it being only necessary to add to the length of the circuitous run-way, the size of the hopper and the number of outlets therein and increase the number of packing devices.

By arranging the run-way below the feed outlets 19 and in such relation thereto that the tops of the containers are almost in contact therewith, it has been found from practical use that the material entering the containers during their passage through the machine is exceedingly accurate, as much so in fact as would be the case if the material was actually weighed upon a scale before being placed in the containers.

What I claim is:—

1. A machine for packing a predetermined quantity by weight of a compressible substance into substantially uniform weight packages, comprising means for charging the receptacle with a quantity of the substance in an uncompressed state, means for compressing the charge, means for re-charging the container with a second quantity of the substance in an uncompressed state, means for compressing said second charge and means for altering the degree of compression of said charges to regulate the weight of the filled container.

2. A machine for packing a compressible substance into substantially uniform weight packages, comprising, means for substantially filling the container with a charge of the substance in an uncompressed state, means for compressing the charge in the container, means for substantially refilling the container thereafter with a second charge of the same substance in an uncompressed state, means for compressing said second charge and means for refilling the container with the substance in an uncompressed state.

3. A machine for packing a compressible substance into substantially uniform weight packages, comprising means for substantially filling the container with a charge of the substance in an uncompressed state, means for compressing the charge in the container, means for substantially refilling the container thereafter with a second charge of the same substance in an uncompressed state, means for compressing said second charge and means for refilling the container with the substance in an uncompressed state, and means for altering the degree of compression to regulate the total weight.

4. A machine for packing a material in continuously moving containers comprising means for filling said traveling containers with successive charges of the material, and means alternating with said filling means and movable with said containers for compressing said charges.

5. A machine for packing material in continuously moving containers comprising means for simultaneously filling a plurality of said traveling containers with successive charges of material, and means alternating with said filling means and movable with the containers for subjecting each charge of a number of containers to simultaneous compression.

6. A machine for packing a material in traveling containers comprising means for feeding in empty containers, means for charging said containers during the movement thereof with said material, means for adding successively other charges of the same material to the containers, and traveling means alternating with the several charge adding means for separately compressing each successive charge during the movement of said containers.

7. A machine for packing material in traveling containers comprising means for feeding in empty containers, means for charging a continuously moving series of the containers during movement thereof, each with successive charges of the same material, and an endless series of packing means movable in unison with the containers and alternating with the filling means in compressing each charge of material after being placed in the container, during the movement of said containers.

8. A machine for packing material in containers comprising a receptacle for holding in bulk the material to be packed and having outlets for charging containers as they pass and repass in continuous uninterrupted lines thereunder, and a packing device movable with the containers disposed between each two outlets for compressing each charge after entering a container.

9. A machine for packing material in traveling containers comprising means for filling said containers with successive accurately measured charges of the material, a separate traveling packing means traveling in the same direction with the containers for compressing each of said charges, and means for varying the degree of pressure exerted by said packing means.

10. A machine for packing accurately measured quantities of material in traveling containers comprising means for filling said containers with successive definite charges of the material, traveling means traveling in the same direction with the containers for compressing each of said charges in the containers before following with succeeding charges and means for delivering the filled and packed containers from the machine.

11. A machine for packing material in traveling containers comprising a hopper or receptacle for said material having outlets for simultaneously supplying material to a plurality of containers, a plurality of groups of packing devices traveling in the same direction with the containers for compressing the material in said containers, and a runway for the containers passing alternately beneath a hopper outlet and a group of compressing devices.

12. A machine for packing material in traveling containers comprising a hopper or receptacle for said material having outlets for simultaneously supplying material to a plurality of containers, a plurality of groups of continuously moving packing devices for compressing the material in said containers, a runway for the containers passing alternately beneath a hopper outlet and a group of compressing devices, and means for advancing the containers along said run-way.

13. A machine for packing material in containers comprising a hopper or receptacle for said material having outlets therefor, a plurality of groups of packing devices for compressing the material in said containers, a run-way for the containers passing alternately beneath a hopper outlet and a group of compressing devices, and means within and forming a part of said run-way for advancing the containers along the same.

14. A machine for packing material in containers comprising a hopper or receptacle for said material having outlets therefor, a plurality of groups of packing devices for compressing the material in said containers, a circuitous run-way for the containers passing alternately beneath a hopper outlet and a group of compressing devices, and means below each group of packing devices and forming a part of said run-way for positively advancing the containers.

15. A machine for packing material in containers moving continuously through the machine comprising a hopper or receptacle for said material having a number of outlets therefor through its bottom for simultaneously supplying material to a plurality of containers, a plurality of groups of packing devices for compressing the material in said containers, a run-way for the containers passing alternately beneath a hopper outlet and a group of compressing devices, and means for advancing the containers along the said run-way.

16. A machine for packing pulverulent material in traveling containers comprising a hopper or receptacle for said material having a plurality of parallel outlets for simultaneously supplying material to different groups of containers, a plurality of groups of packing devices for compressing the material in said containers, a run-way for guiding said containers alternately and consecutively to a hopper outlet and to a packing device, and means for advancing the containers along the said run-way.

17. A machine for packing pulverulent material in traveling containers comprising a hopper or receptacle for said material having a plurality of long narrow outlets for simultaneously delivering the material to a plurality of containers, a circuitous run-way for the containers lying below said hopper and parallel to said outlets, a plurality of groups of packing devices above the runway and alternating with said outlets, and means for advancing the containers along the said run-way.

18. A machine for packing pulverulent material in traveling containers comprising a hopper or receptacle for said material having a plurality of long narrow outlets for the material, a circuitous run-way for the containers lying below said hopper and parallel to said outlets, a plurality of groups of packing devices above the run-way and alternating with said outlets, and rotary carriers for the containers below the packing devices and forming a part of the run-way.

19. A machine for packing pulverulent material in traveling containers comprising a hopper or receptacle for said material having a plurality of long narrow outlets for the material, a circuitous run-way for the containers lying below said hopper and parallel to said outlets, a plurality of revolving groups of packing devices above the run-way and alternating with said outlets, and rotary carriers for the containers below the packing devices and driven thereby at the same speed, said carriers forming a part of the run-way.

20. A machine for packing pulverulent material in traveling containers comprising a hopper or receptacle for said material having a plurality of outlets therefor, a circuitous run-way along which the containers are moved lying below said hopper and passing to and fro under the outlets, a plurality of revolving packing devices above said run-way alternating with said outlets, each of said packing devices comprising an annular series of vertically movable plungers, and rotary carriers for the containers movable in unison with the packing devices and forming a part of said run-way.

21. A machine for packing pulverulent material in a continuous line of traveling containers comprising a circuitous run-way along which said containers are driven, a hopper or receptacle for the material having a plurality of long narrow outlets for said material above different parts of the run-way, and a plurality of revolving groups of packing devices above said run-way and alternating with said outlets.

22. A machine for packing pulverulent material in a continuous line of traveling containers comprising a circuitous run-way along which said containers are driven, a plurality of rotary carriers for positively moving said containers forming a part of said run-way, a receptacle for the material having outlets above the run-way to feed said material to the containers, and a plurality of groups of packing devices each above a rotary carrier for compressing the material into said containers.

23. A machine for packing pulverulent material in traveling containers comprising a circuitous run-way having a feed belt on which the containers are placed and a feed wheel acting on each container at the entering end, a delivery belt at the outlet end, and rotating carriers at intermediate points in the length of the run-way to advance the containers, feeding means for the material above the run-way in advance of each carrier, and a packing device above each carrier alternating with the feeding means.

24. A packing device for compressing material in separate and independently movable containers, comprising a plurality of plungers movable into and out of said containers, said plungers revolving collectively about an axis coincidental with the movement of said containers and means for positioning the containers beneath the plungers.

25. A packing device for compressing material in separate and independently movable containers movable in a line, said packing devices comprising a circular series of vertically movable plungers adapted to be forced into and withdrawn from the containers as they travel coincidental therewith and means for positioning the containers beneath the plungers.

26. A packing device for compressing material into a number of separate and independently movable containers movable in a continuous line comprising a plurality of plungers arranged in a circular series and adapted to rotate about the axis of the series of plungers coincidental with the movement of the containers, a notched disk for positioning the containers beneath the plungers, and a cam ring surrounding the plungers having a cam groove therein, with which each of said plungers is engaged.

27. A packing device for compressing material in a number of separate and independently movable containers continuously movable in a line comprising a plurality of plungers arranged in a circular series and rotatable about the axis of said series coincidental with the movement of the containers, a notched disk for positioning the containers beneath the plungers, a cam ring surrounding said plungers, and means on each plunger engaging a cam groove in said ring for independently raising and lowering said plunger.

28. A packing device for compressing material in a number of containers continuously movable in a line, comprising a plurality of plungers arranged in a circular series and rotatable about the axis of said series coincidental with the movement of the containers, a cam ring surrounding said plungers, means on each plunger engaging a cam groove in said ring for independently raising and lowering said plunger, and a carrier rotating with the series of plungers upon which said containers are supported.

29. A packing device for compressing material in a continuous row of and separate and independently movable containers, comprising vertically movable plungers arranged in a circular series and rotatable about the axis of said series, means for actuating the containers to and maintaining them in alinement with the plungers, a cam ring surrounding said plungers and adjustable vertically with relation thereto, and means carried by each plunger engaging a cam groove in said ring for imparting individual vertical movement to each plunger.

30. A packing device for compressing material in a plurality of separate and independently movable containers comprising a carrier for supporting and continuously advancing a number of containers, a plurality of vertically movable plungers arranged in a circular series above the containers and rotating about the axis of said series, and each adapted to enter one of the containers supported on the carrier, and means surrounding said plungers for imparting to each individual vertical movement.

31. A packing device for compressing material in a number of containers comprising a rotating support for said containers, a plurality of vertically movable plungers arranged in a circular series above said containers and rotatable coincidentally with the carrier, means between the carrier and the plungers for positioning the containers on the carrier beneath the plungers, and means surrounding the plungers for imparting to each an individual vertical movement.

32. A packing device for compressing material in a plurality of movable containers comprising a vertical shaft and means for continuously rotating the same, a horizontal disk fixed to said shaft for supporting the containers, a circular series of plungers above said disk movable vertically in socketed supports carried by said shaft, a cam ring surrounding the plungers, and means on each plunger engaging a cam groove in said ring by which the plungers are moved into and out of the containers and material contained therein subjected to pressure.

33. A packing device for compressing material in a plurality of movable containers comprising a rigid frame, a vertical shaft journaled in said frame and adapted to be rotated continuously, a horizontal carrying disk mounted upon said shaft for supporting the containers, a flanged disk also carried by the shaft above the carrier disk and provided with a circular series of openings therethrough, a circular series of plungers each slidable in one of said openings and adapted to enter and be withdrawn from a container, a cam ring surrounding a series of plungers and adjustably mounted on said frame, said ring having a cam groove therein, and means carried by each plunger adapted to enter said cam groove for raising and lowering said plunger as the series of plungers are rotated.

34. In a machine for packing material in containers, a circuitous run-way for said containers comprising a plurality of fixed sections connected at opposite ends by turns to cause said containers to pass back and forth along the run-way, said turns comprising movable sections for imparting motion to the containers.

35. In a machine for packing material in containers, a circuitous run-way for said containers comprising a plurality of fixed sections connected at opposite ends by turns to cause said containers to pass back and forth along the run-way, said turns comprising movable sections for imparting motion to the containers, a horizontal feed belt at one end of said run-way, and a horizontal delivery belt at its opposite end.

36. In a machine for packing material in containers, a hopper or receptacle for said material having a plurality of long narrow openings in its bottom for the escape of said material, and agitators within the hopper or receptacle for stirring the material therein.

37. In a machine for packing material in a plurality of traveling containers, a hopper or receptacle for said material having a plurality of long narrow openings in the bottom thereof, and a smooth flat surface on each side of each opening, against which the open end of the movable containers may bear, and a plurality of agitators within the hopper or receptacle.

38. In a machine for packing pulverulent material in traveling containers, a hopper or receptacle for said material having a plurality of long narrow openings in the bottom thereof in parallel relation and a smooth horizontal surface on each side of each opening against which the open ends of said movable containers are adapted to bear, an agitator above each of said openings, and an agitator near the top of the hopper or receptacle.

39. In a machine for packing pulverulent material in a plurality of traveling containers, a hopper for said material having a plurality of parallel furrows in the bottom thereof, a long narrow opening in the bottom of each furrow, the walls of which incline downwardly to said opening, an agitator in each furrow above the opening therein, a smooth horizontal surface on each side of each opening in the bottom of the hopper or receptacle against which the open ends of said containers bear as they pass thereunder, and a circuitous run-way passing back and forth below the hopper in line with said openings along which said containers are adapted to travel.

40. A machine for packing a substance into containers comprising means for placing a charge of the substance in the container, means for compressing said charge, means for placing a second charge of the said substance in said container in contact with said first charge, and means for adjusting said compressing means to vary the compactness of said first charge after compression and thereby regulate the weight of the completely charged container.

41. A machine for packing a substance into substantially uniform weight packages comprising means for advancing a train of containers, means for simultaneously charging a plurality of said containers while being advanced, a group of plungers, means for controlling said group of plungers to advance and withdraw said plungers to compress said charges in said containers, means for recharging the charged containers, a second group of plungers, and means for controlling said second group of plungers to advance and withdraw to recompress the substance in the containers.

42. A machine for packing a substance into containers comprising means for advancing a train of containers, means for simultaneously charging a plurality of said containers, a group of plungers, means for controlling said group of plungers to advance and withdraw said plungers to compress said charges in said containers, means for recharging the charged containers, a second group of plungers, means for controlling said second group of plungers to advance and withdraw to recompress the substance in the containers, and means for adjusting said first group of plungers to regulate the degree of compression exerted upon the first charge.

43. A machine for packing a substance into substantially uniform weight packages comprising means for holding the substance, means for continuously charging a train of containers from said holding means, means for compressing the charge in the containers while they are advancing, means for guiding said train so that the containers therein are recharged with said substance, and means for compressing the new charge in said containers while they are advancing.

44. A machine for packing a substance into substantially uniform weight packages comprising a hopper for the substance having an outlet, means for simultaneously advancing and charging a plurality of said containers, means for compressing the charge in each container, means for guiding said containers thereafter to effect the charging thereof with said substance and means for re-compressing the new charges therein.

45. A machine for packing a substance into substantially uniform weight packages comprising means for successively charging and recharging the containers with said substance in an uncompressed state, means alternating with the charging means for compressing the substance in said containers after receiving each charge, and means for adding a further charge of the substance to the containers in an uncompressed state to fill said containers.

In testimony whereof I have hereunto set my hand in presence of two subscribing witnesses.

JAMES C. THOM.

Witnesses:
   JOHN M. DE VINE,
   ELWOOD M. SKINNER.